(12) United States Patent
Yamaguchi et al.

(10) Patent No.: US 8,855,953 B2
(45) Date of Patent: Oct. 7, 2014

(54) ELECTRICAL POWER CONTROL DEVICE AND ELECTRICAL POWER CALCULATION METHOD IN ELECTRICAL POWER CONTROL DEVICE

(75) Inventors: Takashi Yamaguchi, Tokyo (JP); Yugo Tadano, Tokyo (JP); Toru Kakebayashi, Tokyo (JP)

(73) Assignee: Meidensha Corporation, Tokyo (JP)

( * ) Notice: Subject to any disclaimer, the term of this patent is extended or adjusted under 35 U.S.C. 154(b) by 455 days.

(21) Appl. No.: 13/382,687

(22) PCT Filed: Jul. 8, 2010

(86) PCT No.: PCT/JP2010/061636
§ 371 (c)(1),
(2), (4) Date: Jan. 6, 2012

(87) PCT Pub. No.: WO2011/004870
PCT Pub. Date: Jan. 13, 2011

(65) Prior Publication Data
US 2012/0109549 A1    May 3, 2012

(30) Foreign Application Priority Data
Jul. 8, 2009    (JP) ................. 2009-162020

(51) Int. Cl.
*G01R 21/00*    (2006.01)
*H02M 7/48*    (2006.01)
*G01R 21/06*    (2006.01)
*H02M 1/00*    (2006.01)

(52) U.S. Cl.
CPC .......... *H02M 7/48* (2013.01); *H02M 2001/007* (2013.01)
USPC ........... 702/60; 702/61; 702/62; 702/63; 702/64; 702/65

(58) Field of Classification Search
CPC ... G06F 17/5036; G01R 31/025; H02M 3/156
USPC ...................................... 702/62–65
See application file for complete search history.

(56) References Cited

U.S. PATENT DOCUMENTS

| | | |
|---|---|---|
| 2006/0119338 A1 | 6/2006 | Soch |
| 2008/0278123 A1 | 11/2008 | Mehas et al. |
| 2010/0141188 A1 | 6/2010 | Kakebayashi et al. |

FOREIGN PATENT DOCUMENTS

| | | | |
|---|---|---|---|
| JP | 2001-268900 | * | 9/2001 |
| JP | 2001-268900 A | | 9/2001 |

(Continued)

OTHER PUBLICATIONS

English Translation PCT Chapter 2 Search Report.*

(Continued)

*Primary Examiner* — Phuong Huynh
(74) *Attorney, Agent, or Firm* — Foley & Lardner LLP (57) ABSTRACT

A motor drive device including a battery 10; switching elements 15 and 16 which are connected in series with a condenser C2 having a voltage Vdc resulting from an increase action of battery voltage and which are operated in a chopper control; a reactor L2 whose one end is connected with a common connection point of the switching elements 15 and 16; and an inverter 19 for driving a PM motor 20 which is connected between another end of the reactor L2 and a negative-pole terminal of the battery 10. In such a motor drive device, an electrical power W is determined based on the voltage Vdc of positive-side point P of the condenser C2, a current Idc flowing in the reactor L2, and a switching duty $d_1$ of the switching element 15 which satisfies a condition of $0 \leq d_1 \leq 1$, i.e., is determined by calculating $Vdc \cdot d_1 \cdot Idc$.

12 Claims, 2 Drawing Sheets

(56) References Cited

FOREIGN PATENT DOCUMENTS

| JP | 3278188 B2 | | 2/2002 |
|---|---|---|---|
| JP | 2003-348828 | * | 12/2003 |
| JP | 2003-348828 A | | 12/2003 |
| JP | 2007-288979 | * | 11/2007 |
| JP | 2007-288979 A | | 11/2007 |
| JP | 2008-295280 A | | 12/2008 |

OTHER PUBLICATIONS

U.S. Appl. No. 13/382,200, filed Jan. 4, 2012, Yamaguchi et al.

Takata et al., "220000-r/min, 2-kW PM Motor Drive for Turbocharger", *Journal-D of the Institute of Electrical Engineers of Japan*, vol. 125, No. 9, (2005) pp. 854-861.

* cited by examiner

ELECTRICAL POWER CONTROL DEVICE AND ELECTRICAL POWER CALCULATION METHOD IN ELECTRICAL POWER CONTROL DEVICE

TECHNICAL FIELD

The present invention relates to a calculation method of input/output power at the time of drive/regenerative mode, in a power-electronics product which includes a chopper circuit and which is configured, for example, to perform a motor control.

BACKGROUND ART

For example, each of Non Patent Literature 1 and Patent Literatures 1 and 2 has proposed a motor drive device, as a device for supplying electric power of a direct-current power source to a load and for regenerating electric power of the load into the direct-current power source by using a chopper circuit.

CITATION LIST

Non Patent Literature

Non Patent Literature 1: "220000 r/min-2 kW PM Motor Drive System for Turbocharger" in Journal-D of the Institute of Electrical Engineers of Japan, Vol. 125 (2005), No. 9, pp. 854-861

Patent Literature

Patent Literature 1: Japanese Patent No. 3278188
Patent Literature 2: Japanese Patent Application Publication No. 2008-295280

Figure 3:
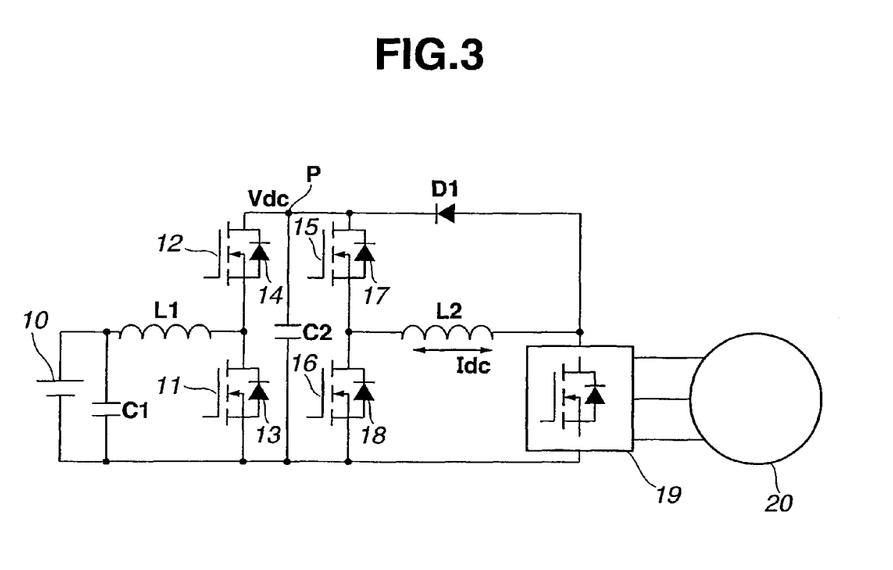
FIG. 3 A circuit diagram showing one example of a motor drive device to which the present invention is applied.

FIG. 3 shows one example of a motor drive device equipped with a direct-current power source, a chopper circuit and an inverter.

In FIG. 3, a reference sign 10 denotes a battery, and a reference sign C1 denotes a condenser. The condenser C1 is connected with the battery 10 to be in parallel with the battery 10. A reference sign 11 denotes a switching element connected through a reactor L1 with the battery 10 to be in parallel with the battery 10. A reference sign 12 denotes a switching element connected with the switching element 11 to be in series with the switching element 11.

The switching element 11 is connected with a free-wheel diode (bypass diode) 13 to be in antiparallel (inverse-parallel) with the free-wheel diode 13. The switching element 12 is connected with a free-wheel diode (bypass diode) 14 to be in antiparallel with the free-wheel diode 14. A series combination of the switching elements 11 and 12 is connected with a condenser C2 to be in parallel with the condenser C2. The condenser C2 is connected with a series combination formed by connecting the switching elements 15 and 16 in series. The condenser C2 is in parallel with this series combination of the switching elements 15 and 16. The switching element 15 is connected with a free-wheel diode (bypass diode) 17 to be in antiparallel with the free-wheel diode 17. The switching element 16 is connected with a free-wheel diode (bypass diode) 18 to be in antiparallel with the free-wheel diode 18.

One end of a reactor L2 is connected with a common connection point of the switching elements 15 and 16. An inverter 19 having a three-phase bridge configuration is disposed between another end of the reactor L2 and a negative-pole terminal of the battery 10, and is connected with the another end of the reactor L2 and the negative-pole terminal of the battery 10. Three-phase output of the inverter 19 is supplied to a PM motor 20.

A common connection point of the inverter 19 and the reactor L2 is connected through anode and cathode of a diode D1 with a common connection point (=point P) of the switching element 12 and the condenser C2.

The inverter 19 is a 120-degree-conduction current-source inverter. The inverter 19 is constituted by switching elements and free-wheel diodes (bypass diodes). The switching elements of the inverter 19 are connected with one another in the form of three-phase bridge. Each of the free-wheel diodes of the inverter 19 is connected with the corresponding switching element of the inverter 19 to be in antiparallel with this switching element.

A gate-drive circuit of the inverter 19, a detector for sensing a voltage Vdc of the point P and a detector for sensing a current Idc flowing in the reactor L2 are omitted from the depiction of Figures.

Operations of the device configured as above will now be explained. At first, at the time of drive mode, the switching element 11 is turned on (opened), so that electric current is applied to the reactor L1 by a direct-current voltage which is derived from the battery 10 and which is smoothed by the condenser C1. Thereby, energy is stored in the reactor L1. Then, the switching element 11 is turned off (closed), so that the energy stored in the reactor L1 is charged through the free-wheel diode 14 into the condenser C2. Thereby, a voltage of the condenser C2 is increased.

By virtue of such a structure, the charging of condenser C2 is possible even if a voltage on the side of condenser C2 is high. Accordingly, the reactor L1, the switching element 11, the diode 14 and the condenser C2 constitute a first boost chopper circuit. At this time, the switching element 11 is repeatedly turned on and off in order to maintain the voltage Vdc of the condenser C2 at a constant level. By varying a target value of this voltage control or regulation (AVR) of the condenser C2, a loss reduction becomes possible.

Moreover, when the switching element 15 is turned on, electric current is applied to the reactor L2 so that energy is stored in the reactor L2. In this case, the drive is impossible unless the voltage Vdc of the side of condenser C2 is higher than a voltage of the side of the reactor L2. Next, when the switching element 15 is turned off and the switching element 16 is turned on, a constant current flows through the switching element 16 and any two now-conducting switching elements of the inverter 19 into the reactor L2 by means of the energy stored in the reactor L2. This electric current is detected by the not-shown current detector. Alternatively, a rotational speed of the PM motor 20 is detected or estimated from a waveform based on gate signals. So as to bring this electric current or rotational speed to its target value, an on/off control of the switching elements 15 and 16 is performed so that a current control (ACR) or a speed control (ASR) is performed. Moreover, by using the on/off control of the switching elements 15 and 16, the motor 20 can be rotated by a voltage level lower than the battery voltage.

Next, operations at the time of regenerative mode will now be explained. At the time of regeneration, the PM motor 20 generates an induced voltage proportional to its rotational speed. If the induced voltage of motor becomes higher than the voltage of the side of reactor L2, electric current can be applied through any of the not-shown free-wheel diodes of the inverter 19 to the side of reactor L2. When the switching element 16 is turned on, the electric current flows in the reactor L2 so that energy is stored in the reactor L2. Then, when the switching element 16 is turned off, electric current flows through the diode 17 by the energy of the reactor L2 at first. Next, the switching element 15 is turned on after a dead time has elapsed. Thereby, electric current flows through the switching element 15 and is charged into the condenser C2, so that the voltage of the condenser C2 is increased.

By virtue of such a structure, the charging of condenser C2 is possible even if the induced voltage of the PM motor 20 is low. Accordingly, the switching elements 15 and 16, the reactor L2 and the condenser C2 constitute a second boost chopper circuit. In this second boost chopper section, a current control (ACR) for maintaining electric current at a constant level, a speed control (ASR) of the PM motor 20, or a power control (APR) for maintaining electric power at a constant level is performed. At this time, electric power is returned to the battery 10 by an increased amount of voltage of the condenser C2 which is caused by a regeneration power derived from the second boost chopper circuit.

As a concrete procedure of retuning electric power to the battery 10, the switching element 12 is turned on to apply electric current to the reactor L1. Thereby, the reactor L1 stores energy. Then, the switching element 12 is turned off, so that electric current is applied through the free-wheel diode 13 to the reactor L1 by the energy of the reactor L1.

Additionally, the positive-side voltage of the inverter 19 is introduced through the diode D1 to the point P of the condenser C2 as a bypass when a gate of the inverter 19 is shut off. Hence, a voltage rise of the inverter 19 can be suppressed. Therefore, damage of the respective switching elements constituting the inverter 19 can be prevented.

SUMMARY OF THE INVENTION

Technical Problem

As mentioned above, in the device of FIG. 3, the voltage control for the voltage Vdc of the point P and the current control for the current Idc flowing in the reactor L2 are performed. Hence, the voltage Vdc and the current Idc are already known.

However, a value of an electric current flowing in the point P (=a region to which the voltage Vdc is applied, i.e., a region producing the voltage Vdc) corresponding to an input portion of direct-current power is unknown. Also, a value of a voltage applied between the negative-pole terminal of the battery 10 and the common connection point of the inverter 19 and the reactor L2 (=a region in which the current Idc flows) is unknown. The common connection point of the reactor L2 and the inverter 19 corresponds to an output portion of the direct-current power. Therefore, an input/output electric power value cannot be calculated.

Therefore, in a case that an output power control or a regenerative power control is performed, in order to control precisely, it has been necessary to measure the electric power value by providing an electric-current detector at the region having the voltage Vdc or providing a voltage detector at the region having the current Idc.

The present invention solves the above problem. It is an object of the present invention to provide an electrical power control device or an electrical power calculation method in an electrical power control device, devised to calculate the input/output electrical power value without using a current detector of the input portion or a voltage detector of the output portion.

Solution to Problem

An electrical power control device comprises: a direct-current power source; a chopper circuit including a first switching element whose one end is connected with a positive-pole terminal side of the direct-current power source, a second switching element whose one end is connected with a negative-pole terminal side of the direct-current power source, wherein the first switching element and the second switching element are provided between the positive-pole terminal and the negative-pole terminal of the direct-current power source in series with the direct-current power source, and a reactor whose one end is connected with a common connection point located between another end of the first switching element and another end of the second switching element; and a load connected between another end of the reactor and the negative-pole terminal of the direct-current power source. This electrical power control device is configured to supply direct-current power of the direct-current power source to the load and is configured to regenerate the direct-current power source with direct-current power of the load by controlling the chopper circuit. In such an electrical power control device, an output voltage Vdc of the direct-current power source, a current Idc flowing in the reactor, a switching duty $d_1$ of the first switching element of the chopper circuit, a switching duty $d_2$ of the second switching element of the chopper circuit, and a dead time DT between the first switching element and the second switching element are known when a normal voltage control and/or current control is carried out. At this time, the switching duty $d_1$ satisfies a condition of $0 \leq d_1 \leq 1$, the switching duty $d_2$ satisfies a condition of $0 \leq d_2 \leq 1$, and the dead time DT satisfies a condition of $0 \leq DT \leq 1$. Moreover, a relation of $1 = d_1 + d_2 + DT$ is satisfied.

Therefore, according to the present invention, an electrical power W is determined (obtained) in the following manner by use of these known values Vdc, Idc, $d_1$, $d_2$ and DT.

That is, (1) In a case that only a drive of load is performed and also that the switching duty $d_1$ is known, the electrical power W is determined by calculating a following formula (1)

$$W = Vdc \cdot d_1 \cdot Idc \tag{1}$$

(2) In a case that only a power regeneration from load is performed and also that the switching duty $d_2$ is known, the electrical power W is determined by calculating a following formula (2).

$$W = Vdc \cdot (1 - d_2) \cdot Idc \tag{2}$$

(3) In a case that the drive of load is performed and also that the switching duty $d_2$ is known, the electrical power W is determined by calculating a following formula (3)

$$W = Vdc \cdot (1 - d_2 - DT) \cdot Idc \tag{3}$$

(4) In a case that electrical power is regenerated from load and also that the switching duty $d_1$ is known, the electrical power W is determined by calculating a following formula (4).

$$W = Vdc \cdot (d_1 + DT) \cdot Idc \tag{4}$$

(5) In a case that the drive of load and the regeneration from load are performed and also that the switching duty $d_1$ and the switching duty $d_2$ are known, the electrical power W is determined by calculating any one of the above formulas (1) to (4).

(6) Furthermore, an internal loss by the chopper circuit is calculated, and thereby, an electrical-power rate (ratio) n between input and output of the chopper circuit is obtained based on the internal loss. Then, from the electrical-power rate n and the electrical power W obtained by one of the above formulas (1) to (4); an electrical power W' adjusted in consideration of an equipment efficiency is determined by calculating a following formula (5).

$$W'=n \cdot W \quad (5)$$

According to the above structures, an electrical-power value can be calculated without providing a current detector for detecting electric current flowing in the direct-current power source (the region to which the voltage Vdc is applied) and a voltage detector for detecting voltage applied to the another end of the reactor (voltage of the region in which the current Idc flows).

Advantageous Effects of Invention (1) According to the inventions, an electrical-power value can be calculated without providing a current detector for detecting electric current flowing in the direct-current power source and without providing a voltage detector for detecting voltage applied to the another end of the reactor.

(2) Moreover, by using the calculated electrical-power value, a drive (power-running) power control or a regenerative power control can be accurately attained without providing the current detector or the voltage detector.

DESCRIPTION OF EMBODIMENTS

Figure 1:
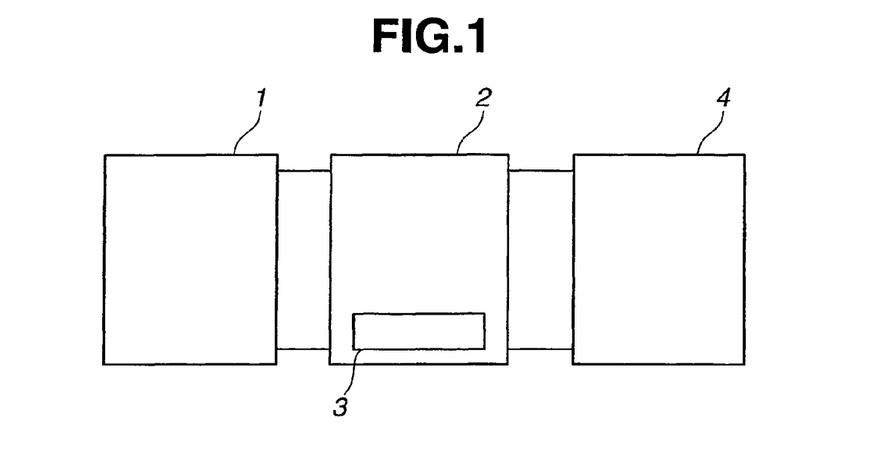
FIG. 1 A configuration view of an electrical power control device to which the present invention is applied.

Hereinafter, embodiments according to the present invention will be explained referring to the drawings. However, the present invention is not limited to examples of the following embodiments. FIG. 1 shows a configuration of an electrical power control device to which the present invention is applied. A reference sign 1 denotes a direct-current power source (DC power source), for example, constituted by a circuit ranging from the point P (to which the voltage Vdc is applied) to the battery 10, i.e., constituted by the battery 10, the condensers C1 and C2, the reactor L1, the switching elements 11 and 12, and the free-wheel diodes 13 and 14 in FIG. 3.

This direct-current power source 1 according to the present invention is not limited to the circuit shown by FIG. 3, and may be a direct-current power source having a thyristor-rectifier bridge circuit or a battery having the voltage value Vdc.

A reference sign 2 denotes a chopper circuit, for example, including the switching elements 15 and 16, the free-wheel diodes 17 and 18 and the reactor L2 in FIG. 3.

A reference sign 3 denotes a control section including a function for calculating an electric power W. For example, this function of the control section 3 calculates the electric power W by using the above formulas (1) to (4) on the basis of the voltage Vdc of point P of FIG. 3, the electric current Idc flowing in the reactor L2, a switching duty $d_1$ of a first switching element (the switching element 15 of FIG. 3) of the chopper circuit 2, a switching duty $d_2$ of a second switching element (the switching element 16 of FIG. 3) of the chopper circuit 2, and the dead time DT between the first switching element and the second switching element. The switching duty $d_1$ satisfies a condition of $0 \le d_1 \le 1$. The switching duty $d_2$ satisfies a condition of $0 \le d_2 \le 1$. The dead time DT satisfies a condition of $0 \le DT \le 1$.

Moreover, the control section 3 includes a function for calculating an electric power W' adjusted by taking the equipment efficiency into consideration. This function of the control section 3 calculates the electric power W', by calculating an internal loss of the chopper circuit 2 and calculating the above formula (5) from the electric power W and a power ratio (rate) n of input and output of chopper circuit based on the internal loss.

Moreover, the control section 3 includes a function for performing a control for supplying direct-current power of the direct-current power source 1 to the direct-current load 4 and a (regenerative) control for returning direct-current power of the direct-current load 4 to the direct-current power source 1 by controlling the chopper circuit 2.

The direct-current load 4, for example in FIG. 3, includes the inverter 19 for converting direct-current power into alternating-current power, and the PM motor 20 connected with an alternating-current side of the inverter 19.

The voltage Vdc, the current Idc, the switching duty (duty time) $d_1$, the switching duty (duty time) $d_2$ and the dead time DT are known ($1=d_1+d_2+DT$) under the normal voltage control or current control. Means for detecting these values are omitted from the depiction of FIG. 1.

Next, concrete examples will now be explained in each of which the present invention is applied to the motor drive device of FIG. 3. In the following examples, operations of the switching elements 11, 12, 15 and 16 at the time of drive mode of the PM motor 20 and at the time of regenerative mode of electric power of the PM motor 20 are basically as mentioned above.

First Example

In a first example, the present invention is applied to a case where only the drive of the PM motor 20 is performed in the circuit of FIG. 3 and where the switching duty $d_1$ of the switching element 15 is known. It is noted that the switching duty $d_1$ is represented by duty=A/B, wherein A denotes a turn-on time of the switching element and wherein B denotes one period of ON-OFF operation.

At this time, the switching elements 16 and 12 whose on-off controls are performed during the regenerative motion are unnecessary. Hence, the combination of the switching element 16 and the diode 18 may be replaced with only the diode 18, and the combination of the switching element 12 and the diode 14 may be replaced with only the diode 14.

A value of the current flowing in the point P (=the region to which the voltage Vdc is applied) of FIG. 3 is equal to $d_1 \cdot Idc$. Accordingly, the control section 3 of FIG. 1 calculates the value of electric power W by the following formula (1).

$$W=Vdc \cdot d_1 \cdot Idc \quad (1)$$

Second Example

In a second example, the present invention is applied to a case where only the regeneration of electric power of the PM motor 20 (regenerative mode by the PM motor 20) is performed in the circuit of FIG. 3 and where the switching duty $d_2$ of the switching element 16 is known.

At this time, the switching elements 15 and 11 whose on-off controls are performed during the drive motion are unnecessary. Hence, the combination of the switching element 15 and the diode 17 may be replaced with only the diode 17, and the combination of the switching element 11 and the diode 13 may be replaced with only the diode 13.

During the regeneration of electric power, a regeneration current flows through the switching element 15 or the diode 17 into the point P (the region to which the voltage Vdc is applied) when the switching element 16 is in OFF state. Accordingly, a value of this regeneration current is equal to a product (multiplication) of the current Idc and a turn-off time $(1-d_2)$ of the switching element 16.

Therefore, the control section 3 of FIG. 1 calculates the value of electric power W by the following formula (2).

$$W = Vdc \cdot (1-d_2) \cdot Idc \tag{2}$$

Third Example

In a third example, the present invention is applied to a case where the drive of the PM motor 20 is performed in the circuit of FIG. 3 and where the switching duty $d_2$ of the switching element 16 is known.

During the drive of the PM motor 20, electric current flows from the point P when the switching element 15 is in ON state. This turn-on time of the switching element 15 is represented by $(1-d_2-DT)$ using the turn-off time $(1-d_2)$ of the switching element 16 and the dead time DT. Accordingly, a value of the current flowing in the point P is equal to $(1-d_2-DT) \cdot Idc$. Therefore, the control section 3 of FIG. 1 calculates the value of electric power W by the following formula (3).

$$W = Vdc \cdot (1-d_2-DT) \cdot Idc \tag{3}$$

Fourth Example

In a fourth example, the present invention is applied to a case where the regeneration of electric power of the PM motor 20 is performed in the circuit of FIG. 3 and where the switching duty $d_1$ of the switching element 15 is known.

During the electric-power regeneration, regenerative current flows in the point P through the switching element 15 turned on when the switching element 16 is in OFF state. This turn-off time of the switching element 16 is represented by a sum $(d_1+DT)$ of the switching duty $d_1$ of the switching element 15 and the dead time DT. Accordingly, a value of the regenerative current flowing in the point P is equal to a product (multiplication) of the current Idc and the turn-off time $(d_1+DT)$ of the switching element 16.

Therefore, the control section 3 of FIG. 1 calculates the value of electric power W by the following formula (4).

$$W = Vdc \cdot (d_1+DT) \cdot Idc \tag{4}$$

Fifth Example

In a fifth example, the present invention is applied to a case where the drive and the electric-power regeneration of the PM motor 20 are performed in the circuit of FIG. 3 and where the switching duty $d_1$ of the switching element 15 and the switching duty $d_2$ of the switching element 16 are known.

The control section 3 of FIG. 1 calculates the value of electric power W by one of the above formulas (1) to (4) of the first to fourth examples.

Sixth Example

The value of electric power which is calculated in the first to fifth examples is the electric-power value of the point P (the region to which the voltage Vdc is applied) of FIG. 3. Hence, in a case of actual equipment (device), this electric-power value of the point P deviates from an electric-power value of input/output portion of the chopper circuit due to an internal loss. Therefore, in this example, the internal loss is calculated. In the case that a rate of electric power of the input/output portion relative to the point P of FIG. 3 is known as n, an accurate electric power W' of the input/output portion can be obtained by calculating the following formula (5) using the electric power W calculated in the first to fifth examples.

$$W' = n \cdot W \tag{5}$$

It is noted that an efficiency η of the equipment can be used as this rate n.

Seventh Example

Figure 2:
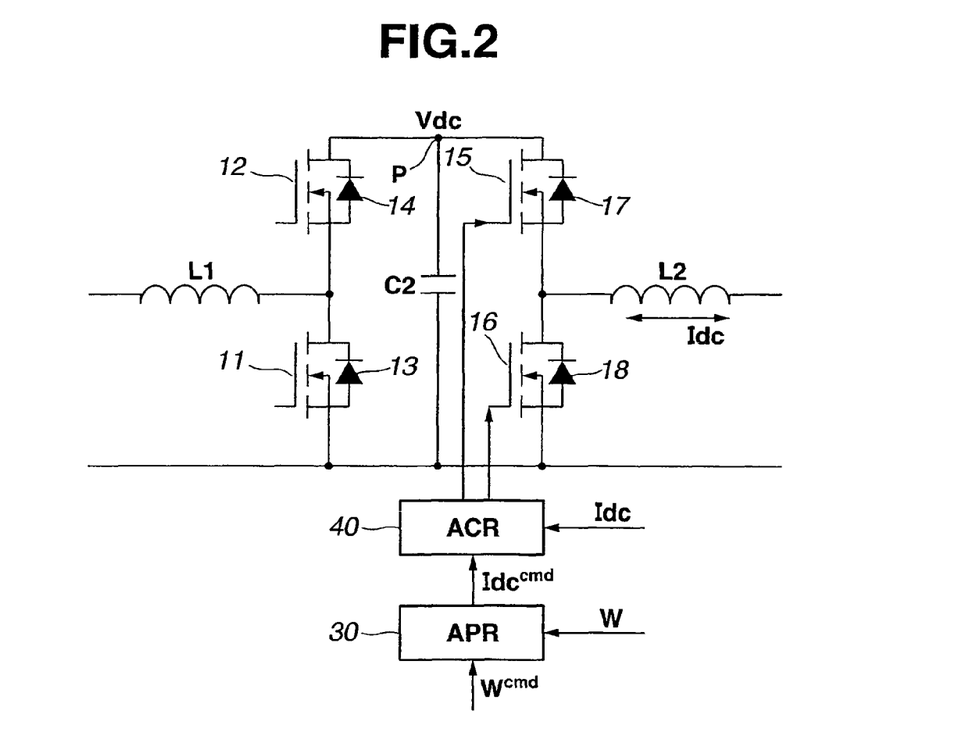
FIG. 2 A main circuit diagram showing seventh to ninth examples according to the present invention.

In a seventh example, a power control or power regulation (APR) including a control loop as shown in FIG. 2 is applied to the switching elements 15 and 16 of FIG. 3 which have performed the current control (ACR) beforehand, on the basis of the electric-power value W (W') calculated in the first to sixth examples. Thereby, the power-running (driving) control and the power-regenerating control can be attained without providing additional current/voltage detector.

FIG. 2 extracts a part from FIG. 3, and shows components same as those of FIG. 3 with same reference signs. In FIG. 2, a reference sign 30 denotes an electric-power control section for performing the power control (APR) on the basis of an electric-power command value $W^{cmd}$ and the electric-power value W (W') calculated in the first to sixth examples.

A reference sign 40 denotes an electric-current control section for performing the current control (ACR) on the basis of an electric-current command value $Idc^{cmd}$ and the electric-current detection value Idc.

Eighth Example

An eighth example is done under the same case as the third example (i.e., under the case where the drive is performed in FIG. 3 and where only the switching duty $d_2$ of the switching element 16 is known) and also under the case of the seventh example. In the eighth example, the dead time DT of the above formula (3) is ignored. That is, the electric-power value W which is a control target is calculated by a following formula (6).

$$W = Vdc \cdot (1-d_2) \cdot Idc \tag{6}$$

In this case, an error in the control is caused by an influence of the dead time. Therefore, the electric-power command value $W^{cmd}$ is modified into $W'^{cmd}$ as shown by a following formula (7). Accordingly, the output electric-power control can be accurately performed because a correction depending on the dead time is added.

$$W'^{cmd} = W^{cmd} + DT \cdot Vdc \cdot Idc \tag{7}$$

Ninth Example

A ninth example is done under the same case as the fourth example (i.e., under the case where the regeneration is performed in FIG. 3 and where only the switching duty $d_1$ of the switching element 15 is known) and also under the case of the seventh example. In the ninth example, the dead time DT of the above formula (4) is ignored. That is, the electric-power value W which is a control target is calculated by a following formula (8).

$$W = Vdc \cdot d_1 \cdot Idc \tag{8}$$

In this case, an error in the control is caused by an influence of the dead time. Therefore, the electric-power command value $W^{cmd}$ is modified into $W'^{cmd}$ as shown by a following formula (9). Accordingly, the output electric-power control can be accurately performed because a correction depending on the dead time is added.

$$W'^{cmd} = W^{cmd} - DT \cdot Vdc \cdot Idc \qquad (9)$$

LIST OF REFERENCE SIGNS

1—Direct-current power source
2—Chopper circuit
3—Control section
4—Direct-current load
10—Battery
11, 12, 15, 16—Switching element
13, 14, 17, 18—Free-wheel diode
19—Inverter
20—PM motor
30—Electric power control section
40—Electric current control section
C1, C2—Condenser
L1, L2—Reactor
D1—Diode

The invention claimed is:

1. An electrical power control device comprising:
a direct-current power source;
a chopper circuit including
a first switching element whose one end is connected with a positive-pole terminal side of the direct-current power source,
a second switching element whose one end is connected with a negative-pole terminal side of the direct-current power source, wherein the first switching element and the second switching element are provided between a positive-pole terminal and a negative-pole terminal of the direct-current power source in series with the direct-current power source, and
a reactor whose one end is connected with a common connection point located between another end of the first switching element and another end of the second switching element;
a load connected between another end of the reactor and the negative-pole terminal of the direct-current power source, wherein the electrical power control device is configured to supply direct-current power of the direct-current power source to the load by controlling the chopper circuit;
a detecting section configured to detect an output voltage Vdc of the direct-current power source, a current Idc flowing in the reactor and a switching duty $d_1$ of the first switching element of the chopper circuit, wherein the switching duty $d_1$ satisfies a condition of $0 \le d_1 \le 1$; and
a control section configured
to calculate a current value $d_1 \cdot Idc$ flowing in a region producing the output voltage Vdc of the direct-current power source, from the detected output voltage Vdc of the direct-current power source, the switching duty $d_1$ of the first switching element and the current Idc flowing in the reactor, and
to determine an electrical power W by calculating $Vdc \cdot d_1 \cdot Idc$ from the output voltage Vdc of the direct-current power source and the current value $d_1 \cdot Idc$.

2. An electrical power calculation method in an electrical power control device comprising:
a direct-current power source;
a chopper circuit including
a first switching element whose one end is connected with a positive-pole terminal side of the direct-current power source,
a second switching element whose one end is connected with a negative-pole terminal side of the direct-current power source, wherein the first switching element and the second switching element are provided between a positive-pole terminal and a negative-pole terminal of the direct-current power source in series with the direct-current power source, and
a reactor whose one end is connected with a common connection point located between another end of the first switching element and another end of the second switching element; and
a load connected between another end of the reactor and the negative-pole terminal of the direct-current power source, wherein the electrical power control device is configured to supply direct-current power of the direct-current power source to the load by controlling the chopper circuit,
the electrical power calculation method comprising:
detecting an output voltage Vdc of the direct-current power source, a current Idc flowing in the reactor, and a switching duty $d_1$ of the first switching element of the chopper circuit, wherein the switching duty $d_1$ satisfies a condition of $0 \le d_1 \le 1$;
calculating a current value $d_1 \cdot Idc$ flowing in a region producing the output voltage Vdc of the direct-current power source, from the detected output voltage Vdc of the direct-current power source, the switching duty $d_1$ of the first switching element and the current Idc flowing in the reactor; and
determining an electrical power W by calculating $Vdc \cdot d_1 \cdot Idc$ from the output voltage Vdc of the direct-current power source and the current value $d_1 \cdot Idc$.

3. An electrical power calculation method in an electrical power control device comprising:
a direct-current power source;
a chopper circuit including
a first switching element whose one end is connected with a positive-pole terminal side of the direct-current power source,
a second switching element whose one end is connected with a negative-pole terminal side of the direct-current power source, wherein the first switching element and the second switching element are provided between a positive-pole terminal and a negative-pole terminal of the direct-current power source in series with the direct-current power source, and
a reactor whose one end is connected with a common connection point located between another end of the first switching element and another end of the second switching element; and
a load connected between another end of the reactor and the negative-pole terminal of the direct-current power source, wherein the electrical power control device is configured to regenerate the direct-current power source with direct-current power of the load by controlling the chopper circuit,
the electrical power calculation method comprising:
detecting an output voltage Vdc of the direct-current power source, a current Idc flowing in the reactor, and a switching duty $d_2$ of the second switching element of the chopper circuit, wherein the switching duty $d_2$ satisfies a condition of $0 \leq d_2 \leq 1$;

calculating a current value $(1-d_2) \cdot Idc$ flowing in a region producing the output voltage Vdc of the direct-current power source, from the detected output voltage Vdc of the direct-current power source, the switching duty $d_2$ of the second switching element and the current Idc flowing in the reactor; and determining an electrical power W by calculating Vdc·$(1-d_2) \cdot Idc$ from the output voltage Vdc of the direct-current power source and the current value $(1-d_2) \cdot Idc$.

4. An electrical power calculation method in an electrical power control device comprising:

a direct-current power source;

a chopper circuit including a first switching element whose one end is connected with a positive-pole terminal side of the direct-current power source, a second switching element whose one end is connected with a negative-pole terminal side of the direct-current power source, wherein the first switching element and the second switching element are provided between a positive-pole terminal and a negative-pole terminal of the direct-current power source in series with the direct-current power source, and a reactor whose one end is connected with a common connection point located between another end of the first switching element and another end of the second switching element; and a load connected between another end of the reactor and the negative-pole terminal of the direct-current power source, wherein the electrical power control device is configured to supply direct-current power of the direct-current power source to the load by controlling the chopper circuit, the electrical power calculation method comprising:

detecting an output voltage Vdc of the direct-current power source, a current Idc flowing in the reactor, a switching duty $d_2$ of the second switching element of the chopper circuit, and a dead time DT between the first switching element and the second switching element, wherein the switching duty $d_2$ satisfies a condition of $0 \leq d_2 \leq 1$, wherein the dead time DT satisfies a condition of $0 \leq DT \leq 1$;

calculating a current value $(1-d_2-DT) \cdot Idc$ flowing in a region producing the output voltage Vdc of the direct-current power source, from the detected output voltage Vdc of the direct-current power source, the switching duty $d_2$ of the second switching element, the dead time DT and the current Idc flowing in the reactor; and determining an electrical power W by calculating Vdc·$(1-d_2-DT) \cdot Idc$ from the output voltage Vdc of the direct-current power source and the current value $(1-d_2-DT) \cdot Idc$.

5. An electrical power control device comprising:

a direct-current power source;

a chopper circuit including a first switching element whose one end is connected with a positive-pole terminal side of the direct-current power source, a second switching element whose one end is connected with a negative-pole terminal side of the direct-current power source, wherein the first switching element and the second switching element are provided between a positive-pole terminal and a negative-pole terminal of the direct-current power source in series with the direct-current power source, and a reactor whose one end is connected with a common connection point located between another end of the first switching element and another end of the second switching element;

a load connected between another end of the reactor and the negative-pole terminal of the direct-current power source, wherein the electrical power control device is configured to regenerate the direct-current power source with direct-current power of the load by controlling the chopper circuit;

a detecting section configured to detect an output voltage Vdc of the direct-current power source, a current Idc flowing in the reactor, a switching duty $d_1$ of the first switching element of the chopper circuit, and a dead time DT between the first switching element and the second switching element, wherein the switching duty $d_1$ satisfies a condition of $0 \leq d_1 \leq 1$, wherein the dead time DT satisfies a condition of $0 \leq DT \leq 1$; and a control section configured to calculate a current value $(d_1+DT) \cdot Idc$ flowing in a region producing the output voltage Vdc of the direct-current power source, from the detected output voltage Vdc of the direct-current power source, the switching duty $d_1$ of the first switching element, the dead time DT and the current Idc flowing in the reactor, and to determine an electrical power W by calculating Vdc·$(d_1+DT) \cdot Idc$ from the output voltage Vdc of the direct-current power source and the current value $(d_1+DT) \cdot Idc$.

6. An electrical power calculation method in an electrical power control device comprising:

a direct-current power source;

a chopper circuit including a first switching element whose one end is connected with a positive-pole terminal side of the direct-current power source, a second switching element whose one end is connected with a negative-pole terminal side of the direct-current power source, wherein the first switching element and the second switching element are provided between a positive-pole terminal and a negative-pole terminal of the direct-current power source in series with the direct-current power source, and a reactor whose one end is connected with a common connection point located between another end of the first switching element and another end of the second switching element; and a load connected between another end of the reactor and the negative-pole terminal of the direct-current power source, wherein the electrical power control device is configured to regenerate the direct-current power source with direct-current power of the load by controlling the chopper circuit, the electrical power calculation method comprising:

detecting an output voltage Vdc of the direct-current power source, a current Idc flowing in the reactor, a switching duty $d_1$ of the first switching element of the chopper circuit, and a dead time DT between the first switching element and the second switching element, wherein the switching duty $d_1$ satisfies a condition of $0 \leq d_1 \leq 1$, wherein the dead time DT satisfies a condition of $0 \leq DT \leq 1$;

calculating a current value $(d_1+DT) \cdot Idc$ flowing in a region producing the output voltage Vdc of the direct-current power source, from the detected output voltage Vdc of the direct-current power source, the switching duty $d_1$ of the first switching element, the dead time DT and the current Idc flowing in the reactor; and determining an electrical power W by calculating $Vdc \cdot (d_1+DT) \cdot Idc$ from the output voltage Vdc of the direct-current power source and the current value $(d_1+DT) \cdot Idc$.

7. An electrical power calculation method in an electrical power control device comprising:
a direct-current power source;
a chopper circuit including
a first switching element whose one end is connected with a positive-pole terminal side of the direct-current power source,
a second switching element whose one end is connected with a negative-pole terminal side of the direct-current power source, wherein the first switching element and the second switching element are provided between a positive-pole terminal and a negative-pole terminal of the direct-current power source in series with the direct-current power source, and
a reactor whose one end is connected with a common connection point located between another end of the first switching element and another end of the second switching element; and
a load connected between another end of the reactor and the negative-pole terminal of the direct-current power source, wherein the electrical power control device is configured to supply direct-current power of the direct-current power source to the load and to regenerate the direct-current power source with direct-current power of the load by controlling the chopper circuit,
the electrical power calculation method comprising:
a first step of detecting an output voltage Vdc of the direct-current power source, a current Idc flowing in the reactor, a switching duty $d_1$ of the first switching element of the chopper circuit, a switching duty $d_2$ of the second switching element of the chopper circuit and a dead time DT between the first switching element and the second switching element, wherein the switching duty $d_1$ satisfies a condition of $0 \leq d_1 \leq 1$, wherein the switching duty $d_2$ satisfies a condition of $0 \leq d_2 \leq 1$, wherein the dead time DT satisfies a condition of $0 \leq DT \leq 1$; and
one of a second step of
calculating a current value $d_1 \cdot Idc$ flowing in a region producing the output voltage Vdc of the direct-current power source, from the detected output voltage Vdc of the direct-current power source, the switching duty $d_1$ of the first switching element and the current Idc flowing in the reactor, and
determining an electrical power W by calculating $Vdc \cdot d_1 \cdot Idc$ from the output voltage Vdc of the direct-current power source and the current value $d_1 \cdot Idc$,
a second step of
calculating a current value $(1-d_2) \cdot Idc$ flowing in a region producing the output voltage Vdc of the direct-current power source, from the detected output voltage Vdc of the direct-current power source, the switching duty $d_2$ of the second switching element and the current Idc flowing in the reactor, and determining an electrical power W by calculating $Vdc \cdot (1-d_2) \cdot Idc$ from the output voltage Vdc of the direct-current power source and the current value $(1-d_2) \cdot Idc$,
a second step of
calculating a current value $(1-d_2-DT) \cdot Idc$ flowing in a region producing the output voltage Vdc of the direct-current power source, from the detected output voltage Vdc of the direct-current power source, the switching duty $d_2$ of the second switching element, the dead time DT and the current Idc flowing in the reactor, and
determining an electrical power W by calculating $Vdc \cdot (1-d_2-DT) \cdot Idc$ from the output voltage Vdc of the direct-current power source and the current value $(1-d_2-DT) \cdot Idc$, and
a second step of
calculating a current value $(d_1+DT) \cdot Idc$ flowing in a region producing the output voltage Vdc of the direct-current power source, from the detected output voltage Vdc of the direct-current power source, the switching duty $d_1$ of the first switching element, the dead time DT and the current Idc flowing in the reactor, and
determining an electrical power W by calculating $Vdc \cdot (d_1+DT) \cdot Idc$ from the output voltage Vdc of the direct-current power source and the current value $(d_1+DT) \cdot Idc$.

8. The electrical power calculation method according to claim 2, further comprising:
calculating an internal loss of the chopper circuit; and
determining an equipment-efficiency-considered electrical power W' from the electrical power W and an electrical-power rate n between input and output of the chopper circuit based on the internal loss, by calculating $n \cdot W$.

9. The electrical power calculation method according to claim 3, further comprising:
calculating an internal loss of the chopper circuit; and
determining an equipment-efficiency-considered electrical power W' from the electrical power W and an electrical-power rate n between input and output of the chopper circuit based on the internal loss, by calculating $n \cdot W$.

10. The electrical power calculation method according to claim 4, further comprising:
calculating an internal loss of the chopper circuit; and
determining an equipment-efficiency-considered electrical power W' from the electrical power W and an electrical-power rate n between input and output of the chopper circuit based on the internal loss, by calculating $n \cdot W$.

11. The electrical power calculation method according to claim 6, further comprising:
calculating an internal loss of the chopper circuit; and
determining an equipment-efficiency-considered electrical power W' from the electrical power W and an electrical-power rate n between input and output of the chopper circuit based on the internal loss, by calculating $n \cdot W$.

12. The electrical power calculation method according to claim 7, further comprising:
calculating an internal loss of the chopper circuit; and
determining an equipment-efficiency-considered electrical power W' from the electrical power W and an electrical-power rate n between input and output of the chopper circuit based on the internal loss, by calculating $n \cdot W$.

* * * * *